US012412349B1

(12) United States Patent
Petrell et al.

(10) Patent No.: US 12,412,349 B1
(45) Date of Patent: Sep. 9, 2025

(54) MANAGING GRAPHICAL ELEMENTS IN AUGMENTED REALITY

(71) Applicant: Distance Technologies Oy, Helsinki (FI)

(72) Inventors: Joona Petrell, Tampere (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/229,375

(22) Filed: Jun. 5, 2025

(51) Int. Cl.
*G06T 19/00* (2011.01)
*H04N 13/00* (2018.01)
*H04N 13/122* (2018.01)
*H04N 13/383* (2018.01)

(52) U.S. Cl.
CPC ......... *G06T 19/006* (2013.01); *H04N 13/122* (2018.05); *H04N 13/383* (2018.05); *H04N 2013/0077* (2013.01)

(58) Field of Classification Search
None
See application file for complete search history.

(56) References Cited

U.S. PATENT DOCUMENTS

| 2014/0267421 A1* | 9/2014 | Sung | G06T 19/006 345/633 |
| 2022/0099969 A1* | 3/2022 | Kunze | G08G 1/16 |
| 2023/0298286 A1* | 9/2023 | Okamoto | G06F 3/1423 345/633 |
| 2024/0112303 A1* | 4/2024 | Chapdelaine-Couture | G06T 5/50 |

* cited by examiner

*Primary Examiner* — Ryan M Gray
(74) *Attorney, Agent, or Firm* — ZIEGLER IP LAW GROUP, LLC.

(57) ABSTRACT

A method includes obtaining information indicative of a relative location of each eye of at least one user with respect to an image plane of an augmented-reality display, generating or retrieving at least one image to be displayed based on the obtained information, identifying a plurality of graphical elements to be presented by the at least one image, detecting a potential overlap between at least two of the plurality of graphical elements from a perspective of a given eye of the at least one user, identifying distinct sets of allowed operations for respective graphical elements, determining a corresponding cost for each allowed operation, selecting at least one operation based on the allowed operations and their corresponding costs, applying the selected operation to at least one graphical element to modify the at least one image, and displaying the at least one image at the augmented-reality display.

20 Claims, 5 Drawing Sheets

MANAGING GRAPHICAL ELEMENTS IN AUGMENTED REALITY

TECHNICAL FIELD

The present disclosure relates to systems for managing graphical elements in augmented-reality displays. The present disclosure also relates to methods for managing graphical elements in augmented-reality displays.

BACKGROUND

Augmented-reality displays are used in automotive systems, wearable devices, and see-through optical interfaces to render graphical elements over a real-world environment while maintaining a transparency of an image plane associated with the augmented-reality display. The graphical elements may be anchored to real-world objects, positioned relative to a field of view of a viewer, or displayed at varying optical depths based on a spatial context of use. In augmented-reality displays used in automotive systems and wearable devices, the augmented-reality displays often render a combination of navigation indicators, alerts, user interface elements, and environment-related annotations that change dynamically with respect to a position and head orientation of the viewer.

In conventional augmented-reality displays, graphical elements are frequently rendered without a mechanism for adaptive placement or prioritisation. When multiple graphical elements occupy overlapping regions of the image plane associated with the augmented-reality display, a visual clutter may occur that reduces a readability of information presented to the viewer. Such overlaps are especially likely in regions with a high density of rendered graphical content, such as near a horizon line or over a high-contrast region of a real-world background. In an absence of layout adjustments that account for a relevance or a functional role of each graphical element, a graphical element of lesser importance may obscure a graphical element of greater relevance, thereby impairing a legibility of operationally significant information.

In augmented-reality displays that do not consider a stereoscopic perspective of both eyes of the viewer, a graphical element may appear to overlap from a perspective of one eye while remaining visually separate from a perspective of another eye, leading to inconsistencies in perceived depth of the rendered graphical content. Such inconsistencies in the perceived depth reduce a stereo fidelity of the augmented-reality display and may lead to a disruption in a visual interpretation of spatial relationships between the rendered graphical elements. In optical see-through displays configured to present light field or multiscopic imagery, a monocular inconsistency in graphical content presentation may interfere with an ability of the viewer to perceive depth cues or maintain a stable fixation.

Therefore, a need exists for augmented-reality display systems that can improve a visual clarity and spatial organisation of the rendered graphical elements under varying display conditions. Systems are required that can address limitations of layout strategies of the conventional augmented-reality displays by preventing uncontrolled overlap, preserving binocular consistency, and maintaining a stable and interpretable visual presentation to the eyes of viewers.

SUMMARY

The present disclosure seeks to provide a method for managing graphical elements in augmented-reality displays. The method comprises determining a relative location of each eye of a user with respect to an image plane, detecting a potential overlap between graphical elements, selecting at least one operation to be applied to at least one graphical element based on a cost associated with each allowed operation, and modifying an image to be displayed based on the selected operation. The present disclosure also seeks to provide a system for managing graphical elements in augmented-reality displays. The system comprises an augmented-reality display and at least one processor configured to detect a potential overlap between graphical elements from a perspective of a given eye of a user to identify distinct sets of allowed operations for respective graphical elements with associated costs, and apply at least one selected operation to modify the graphical elements and prevent the potential overlap. The aim of the present disclosure is achieved by the system and the method as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method comprising:
   obtaining information indicative of a relative location of each eye of at least one user with respect to an image plane of an augmented-reality (AR) display;
   generating or retrieving at least one image to be displayed via the AR display, based on the relative location of each eye of the at least one user with respect to the image plane;

identifying a plurality of graphical elements to be presented by the at least one image;

detecting a potential overlap between at least two of the plurality of graphical elements from a perspective of a given eye of the at least one user, based on a relative location of the given eye with respect to the image plane;

identifying distinct sets of allowed operations for respective ones of the at least two of the plurality of graphical elements, wherein a set of allowed operations for a graphical element comprises at least one of:
  displacing the graphical element,
  resizing the graphical element,
  hiding the graphical element at least partially,
  merging the graphical element with another graphical element,
  modifying at least one appearance parameter of the graphical element;

for each allowed operation in each of the distinct sets, determining a corresponding cost representing a penalty for applying said allowed operation on a respective graphical element;

selecting, based on the allowed operations in each of the distinct sets and their corresponding costs, at least one operation to be applied to at least one of the at least two of the plurality of graphical elements to prevent the potential overlap;

applying the selected at least one operation to the at least one of the at least two of the plurality of graphical elements, to modify the at least one image to be displayed; and displaying the at least one image at the AR display.

In a second aspect, the present disclosure provides a system comprising:

an augmented-reality (AR) display; and at least one processor configured to:
  obtain information indicative of a relative location of each eye of at least one user with respect to an image plane of the AR display;
  generate or retrieve at least one image to be displayed via the AR display, based on the relative location of each eye of the at least one user with respect to the image plane;
  identify a plurality of graphical elements to be presented by the at least one image;
  detect a potential overlap between at least two of the plurality of graphical elements from a perspective of a given eye of the at least one user, based on a relative location of the given eye with respect to the image plane;
  identify distinct sets of allowed operations for respective ones of the at least two of the plurality of graphical elements, wherein a set of allowed operations for a graphical element comprises at least one of:
    displacing the graphical element,
    resizing the graphical element,
    hiding the graphical element at least partially,
    merging the graphical element with another graphical element,
    modifying at least one appearance parameter of the graphical element;
  for each allowed operation in each of the distinct sets, determine a corresponding cost representing a penalty for applying said allowed operation on a respective graphical element;
  select, based on the allowed operations in each of the distinct sets and their corresponding costs, at least one operation to be applied to at least one of the at least two of the plurality of graphical elements to prevent the potential overlap;
  apply the selected at least one operation to the at least one of the at least two of the plurality of graphical elements, to modify the at least one image to be displayed; and
  display the at least one image at the AR display.

The present disclosure provides the aforementioned method and system for displaying the at least one image at an augmented-reality (AR) display. Based on detecting the potential overlap between at least two of the plurality of graphical elements of the image to be displayed from the perspective of the given eye, the method comprises resolving of the visual overlap before actual overlap occurs, thereby improving readability, spatial clarity, and user attention retention.

Moreover, by identifying distinct sets of allowed operations and determining a corresponding cost for each allowed operation, the method enables cost-aware image modification using fewer computational resources, as opposed to modifying the entire image, which would otherwise demand significantly higher processing load and time. Further, each potential overlap between graphical elements is different in terms of spatial context, size, visual priority, or semantic role. Thus, the method treats each such overlap individually and resolves adaptively, rather than relying on a fixed or uniform operation for all overlaps. The per-overlap and cost-based image modification ensures that only localized adjustments are applied, which reduces processing overhead while preserving the overall structure and appearance of the image. As a result, the method improves the efficiency and responsiveness of the AR rendering pipeline and enables the displaying of the at least one image to be contextually optimized and visually coherent, even in complex or dense visual scenarios.

In certain implementations, the claimed method is applicable to head-mounted AR devices, where graphical elements such as virtual annotations, task instructions, or user interfaces are required to be presented over physical environments without occlusion or distortion. The method is also suitable for automotive AR systems, such as windshield-based HUDs (heads-up displays), where navigation prompts, hazard indicators, and environmental data are presented to a user. Furthermore, the method is also applicable in AR-assisted industrial maintenance or assembly applications for spatially and accurate overlays of tools, components, or instructions, even when graphical density is high. The method is also relevant to education and retail installations, where multiple graphical elements are presented over physical exhibits, enabling clear and context-aware visual augmentation without graphical clutter. For example, in retail environment, the method is used in smart shelving systems or AR-enabled product displays, where price tags, promotional content, and product comparisons are superimposed over items without overlapping or occluding critical product information. The method is also implemented in interactive AR learning stations within science laboratories or classrooms, where anatomical diagrams, chemical structures, or historical reconstructions are overlaid on physical models or artifacts based on the eye position of user.

The present disclosure provides the method for managing graphical elements in augmented-reality displays. The method allows generation or retrieval of the at least one image based on the relative location of each eye of the at least one user, without being constrained by a specific display architecture. For example, in a stereoscopic display implementation, separate images are generated for a first eye and a second eye of a user. In contrast, in an autostereoscopic display, a single image is generated such that different pixels are directed to different eyes of the at least one user. As a result, the method accommodates stereoscopic, autostereoscopic, and waveguide-based display implementations by adapting the generation or retrieval of the at least one image according to the optical characteristics of the augmented-reality display and the spatial configuration of the eyes of the user with respect to the image plane.

The at least one image comprises multiple graphical elements that are intended to be presented via the augmented-reality display. A situation is identified in which at least two of the graphical elements interfere visually with each other from a perspective of a given eye of the at least one user. The term "potential overlap" as used throughout the present disclosure, refers to a condition where at least two graphical elements overlap or are expected to overlap based on a current or predicted position of the given eye relative to the image plane of the augmented-reality display. The detection of the potential overlap is performed separately for each eye of each user. In particular, the potential overlap is evaluated for the given eye of the at least one user and for another eye of the at least one user. As the augmented-reality display presents different images to the given eye and to the another eye, an overlap may arise in one view but not in the other. Detecting and resolving the overlap independently for each eye allows perceptual consistency to be maintained across stereoscopic views. A technical benefit provided is that the method preserves binocular clarity and depth cues, reducing visual confusion and improving spatial stability in the presentation of the graphical elements.

Following detection of the potential overlap, a set of layout adjustments is determined for the graphical elements involved. For each graphical element among the at least two graphical elements, a distinct set of allowed operations is identified. The distinct set of operations include displacing the graphical element to a different position, resizing the graphical element to occupy a smaller visual extent, hiding the graphical element at least partially by fading out or collapsing the graphical element, merging the graphical element with another graphical element, or modifying at least one appearance parameter of the graphical element. The selection of the allowed operations for each graphical element accounts for a nature of the visual interference of the graphical element within the field of view. A technical benefit enabled is that the method accommodates a wide range of visual modifications, allowing perceptually meaningful graphical elements to retain prominence while other graphical elements are selectively adjusted.

Each allowed operation within the distinct set of allowed operations is associated with the cost representing the penalty for applying the operation to the graphical element. The costs are pre-stored for each operation type and used to evaluate the trade-off between visual adjustment and perceptual importance. For example, a higher cost is assigned to displacing a graphical element that is normally presented near a central portion of the field of view, compared to a graphical element that can be unobtrusively modified. The use of cost values enables layout changes to be governed by an objective measure of visual impact associated with the applied operation. A technical benefit provided is that the method allows layout decisions to be made according to prioritised criteria, improving clarity of the final image while avoiding arbitrary modification of the graphical elements.

To resolve the potential overlap, a selection is made among the allowed operations such that a total cost of the selected operations is minimised. Advantageously, the selected operation is applied to only one of the at least two graphical elements if doing so resolves the overlap with lower cost than modifying both. The method prevents the visual conflict without unnecessarily disrupting layout stability by determining which of the graphical elements should be adjusted and how the adjustment should be applied. A provided technical benefit is that the method facilitates cost-efficient resolution of visual overlap, maintaining both interpretability and perceptual balance across the image presented to the at least one user.

Once the selection has been made, the selected operation is applied to at least one of the at least two graphical elements. The application of the operation modifies the at least one image to be displayed via the augmented-reality display. The graphical elements, as presented in the modified image, do not interfere visually from the perspective of the given eye of the at least one user. The modification includes any combination of displacement, resizing, partial hiding, merging, or appearance adjustment. A technical benefit facilitated is that the graphical elements remain visible, interpretable, and spatially distinct, even under conditions where multiple graphical elements are presented simultaneously within the field of view of the at least one user, and without relying on fixed placements or manual reconfiguration.

In an exemplary implementation, the method adjusts flexible graphical elements such as directional indicators or informational overlays to avoid potential overlap with higher-priority graphical elements, for example, those associated with real-world objects in a path of the user. A graphical element composed of multiple parts, such as a navigation arrow, may be selectively hidden only in a region closest to the potential overlap, while another may be displaced slightly within the field of view of the user. The operations are based on pre-assigned costs and preserve the interpretability and visibility of the graphical elements without disrupting overall layout stability.

The present disclosure further provides the system for managing graphical elements in augmented-reality displays. The system enables presentation of graphical elements toward the eyes of the at least one user by continuously adapting to spatial conflicts between the graphical elements and selecting layout modifications that minimise visual interference. A technical benefit provided by the system is that perceptual clarity and spatial coherence of the graphical elements are maintained across varying user positions, content arrangements, and different types of augmented-reality display, without relying on static display layouts.

In an exemplary implementation, the method enables modification of the layout of flexible graphical elements, such as navigation aids or informational indicators, based on predicted spatial relationships with higher-priority graphical elements associated with real-world objects. When a potential overlap is identified, the method comprises applying selective operations such as partial hiding of a less critical segment or repositioning of a non-fixed graphical element. The selection of the operation is guided by pre-assigned cost values, allowing to maintain visual prominence of prioritised graphical elements while preserving consistency in overall presentation.

Optionally, the method further comprising classifying the plurality of graphical elements into graphical elements of a first anchor type and graphical elements of a second anchor type,
- wherein a graphical element of the first anchor type is to be positioned in the at least one image based on a position of a corresponding real-world reference object, and wherein a graphical element of the second anchor type is to be positioned in the at least one image based on at least one spatial anchor positioned in a three-dimensional (3D) view frustum corresponding to the given eye,
- wherein the corresponding cost for each allowed operation in each of the distinct sets is determined based at least in part on whether the respective graphical element to which said allowed operation is to be applied has the first anchor type or the second anchor type.

The classification of the plurality of graphical elements includes identifying graphical elements that are to be positioned in the at least one image based on the position of the corresponding real-world reference object, and identifying graphical elements that are to be positioned based on at least one spatial anchor located within the 3D view frustum corresponding to the given eye. The graphical element positioned based on the position of the corresponding real-world reference object is classified as the graphical element of the first anchor type. The graphical element positioned based on the at least one spatial anchor located within the three-dimensional view frustum corresponding to the given eye is classified as the graphical element of the second anchor type. The classification enables to distinguish between graphical elements that are spatially tied to external objects and those that are free to move within the field of view of the user.

The corresponding cost for each allowed operation is determined based at least in part on whether the respective graphical element is classified as having the first anchor type or the second anchor type. In particular, the graphical element of the first anchor type is associated with a higher cost for displacing the graphical element, as such displacement would result in a mismatch between the graphical element and the position of the corresponding real-world reference object. By contrast, the graphical element of the second anchor type is associated with a relatively lower cost for displacing the graphical element, as the spatial anchor within the view frustum can support more flexible repositioning. A technical benefit enabled by this classification is that spatial coherence is maintained for content that is intended to correspond to real-world positions, while allowing more dynamic rearrangement of content that is anchored within the field of view of the user.

Optionally, the step of determining the corresponding costs for the allowed operations in each of the distinct sets comprises assigning a cost for displacing a graphical element based at least in part on a displacement destination of the graphical element.

The cost may be assigned based on at least one of: a distance from an intended position of the graphical element, a position relative to a centre of a frustum cross-section of the 3D view frustum corresponding to the given eye, or whether the displacement occurs along a permitted axis. For example, a lower cost may be associated with repositioning the graphical element within a nearby region, whereas a higher cost may be associated with repositioning the graphical element further away from the intended position thereof. Similarly, a higher cost may be assigned to repositioning the graphical element toward peripheral regions of the 3D view frustum cross-section, while a lower cost may be assigned when the graphical element is retained closer to the centre. In addition, the cost may be influenced by whether the displacement follows a direction permitted for that graphical element, such as along a vertical axis in the case of text labels.

Further, the displacement destination for the graphical element may be evaluated based on contextual relevance of the displaced graphical element and visual characteristics of a surrounding region in the image plane. For example, displacement of the graphical element toward a portion of the image plane that is spatially aligned with a horizon line may be associated with an increased cost because regions near the horizon line typically contain both real-world and graphical elements, and are subject to high contrast transitions between sky and ground. Such characteristics of the horizon line reduce visibility of the graphical element and interfere with legibility, particularly when multiple visual elements compete for user attention. The increased cost therefore discourages displacement of the graphical element toward such regions near the horizon line in the image plane. A technical benefit of assigning the cost based on a visual characteristic of the displacement destination is that the graphical element is repositioned in a manner that maintains visual clarity and avoids perceptual degradation in display regions that are visually dense or complex.

Additionally, the cost associated with the displacement destination may reflect a likelihood of occlusion of the graphical element after displacement. The augmented-reality display may be implemented in an environment where physical objects, such as structural elements of a vehicle, a dashboard-mounted device, a sun visor, or internal equipment, partially or fully block a portion of the display surface or viewing region. If the displacement destination for the graphical element lies within a portion of the image plane that is known to correspond to such a visually obstructed area, a higher cost is assigned. The cost determination may also incorporate display-specific constraints such as a boundary of a reflective surface used to project the graphical element toward the eye of the user. A technical benefit provided is that the graphical element is prevented from being displaced to a portion of the image plane that would render it visually inaccessible, thereby preserving legibility and interpretability of the graphical element within the field of view of the user.

Optionally, the method further comprising:
- capturing at least one real-world image of a real-world environment using at least one real-world facing camera;
- determining a colour and luminance of different portions of a real-world light field overlapping with respective portions of the image plane, based on the at least one real-world image and the relative location of the given eye with respect to the image plane; and
- calculating a colour difference and a luminance difference between a colour and luminance of a given graphical element and a colour and luminance of a portion of the real-world light field overlapping with a portion of the image plane that includes a given displacement destination for the given graphical element;
- wherein the step of determining the corresponding costs for the allowed operations in each of the distinct sets comprises assigning a cost for displacing the given graphical element to the given displacement destination based at least in part on the colour difference and the luminance difference.

The real-world environment includes regions of varying colour, luminance, and contrast that may affect visibility of the graphical elements when viewed through the augmented-reality display. In order to account for such variations, image data is acquired using at least one real-world facing camera and used to analyse how the real-world light field appears through the image plane from the perspective of the given eye. The analysis of the image data includes identifying portions of the real-world light field that spatially correspond to different areas of the image plane and characterising each such portion in terms of colour and luminance as it would appear to the given eye.

When selecting a displacement destination for a graphical element, the method compares the colour and luminance of the graphical element with that of the real-world content underlying the displacement destination.

The greater the similarity or contrast between the two, the more likely it is that the graphical element will become visually indistinct or difficult to perceive. Therefore, the colour difference and the luminance difference between the graphical element and the underlying real-world region are used as part of the cost determination. A higher cost is associated with displacement destinations where the graphical element would visually blend into the background or compete with high-contrast transitions, such as skyline boundaries or textured objects. A lower cost is associated with regions where the graphical element is visually distinct. A technical benefit of using colour and luminance difference in the cost model is that the graphical elements are repositioned into regions that maintain perceptual prominence, thereby improving legibility and preserving clarity within the augmented-reality display.

Optionally, the method further comprising:
determining whether a given graphical element from the at least two of the plurality of graphical elements occupies more than a predefined percentage of a size of a three-dimensional (3D) view frustum corresponding to the given eye along at least one direction; and
when it is determined that the given graphical element occupies more than the predefined percentage of the size of the 3D view frustum along the at least one direction, and when a set of allowed operations for the given graphical element comprises hiding the given graphical element at least partially, the step of selecting the at least one operation comprises:
dividing the given graphical element into graphical sub-elements based at least in part on a location of the potential overlap; and
selecting to hide at least one of the graphical sub-elements that is nearest to the location of the potential overlap.

In certain scenarios, a graphical element may occupy a large portion of the 3D view frustum corresponding to the given eye, such that an overlap affects only a part of the graphical element. Instead of hiding the entire graphical element, the method allows the graphical element to be divided into smaller sub-elements, which are then independently evaluated for modification. When the potential overlap is detected near a specific portion of the graphical element, the sub-element closest to the overlap is selected for partial hiding. The selection of the sub-element allows the rest of the graphical element to remain visible and continue conveying an intended function thereof. A technical benefit provided is that the method supports fine-grained visual adjustments that preserve essential information while addressing spatial conflicts only in affected regions of the image plane.

Optionally, when the distinct sets of the allowed operations for the respective ones of the at least two of the plurality of graphical elements comprise hiding the respective ones of the at least two of the plurality of graphical elements at least partially, the step of determining the corresponding costs for the allowed operations in each of the distinct sets comprises:
assigning respective costs for at least partially hiding the respective ones of the at least two of the plurality of graphical elements based at least in part on relative sizes of the at least two of the plurality of graphical elements.

In scenarios involving partial occlusion between graphical elements, the relative sizes of the overlapping elements influence how visually disruptive a hiding operation would be. When both graphical elements are allowed to be at least partially hidden, the method determines the cost for hiding each graphical element based on the size thereof relative to the other graphical element. It will be appreciated that a smaller graphical element may be entirely obscured by a larger one, or a small portion of a large graphical element may need to be hidden to make space for a smaller but higher-priority element. In such scenarios, hiding a portion of a larger graphical element may have minimal visual impact, particularly when the remaining portion remains clearly visible and continues to convey its intended meaning.

The method comprises assigning lower costs for partially hiding larger graphical elements and higher costs for partially hiding smaller graphical elements that may lose visual recognisability when obscured. For example, when a large navigation arrow overlaps with a small icon indicating a point of interest, the cost of hiding a small part of the arrow is low, while the cost of obscuring the smaller icon is high, as the latter may be rendered ineffective. A technical benefit provided is that the method favours hiding decisions that preserve the functional legibility of smaller elements while tolerating minor reductions in visibility for larger elements, thereby maintaining usability of the graphical interface under constrained layout conditions.

Optionally, the method further comprising identifying functional categories to which the respective ones of the at least two of the plurality of graphical elements belong,
wherein when the distinct sets of the allowed operations for the respective ones of the at least two of the plurality of graphical elements comprise hiding the respective ones of the at least two of the plurality of graphical elements at least partially, the step of determining the corresponding costs for the allowed operations in each of the distinct sets comprises:
assigning respective costs for at least partially hiding the respective ones of the at least two of the plurality of graphical elements based at least in part on whether the at least two of the plurality of graphical elements belong to a same functional category.

The term "functional category" as used throughout the present disclosure refers to a category assigned to a graphical element based on at least one of: a role of the graphical element, a type of real-world object to which the graphical element refers, or a type of virtual information that the graphical element represents within an augmented-reality implementation. Graphical elements belonging to a same functional category share similar semantic meaning or user-interaction relevance. Examples of functional categories include graphical elements that indicate pedestrians, vehicles, traffic signs, navigation aids, points of interest, or system status information.

When the distinct sets of the allowed operations comprise partially hiding graphical elements, the method determines the cost for each partial hiding operation based at least in part on whether the graphical elements involved in the potential overlap belong to a same functional category. A lower cost is assigned for hiding one graphical element behind another when both belong to a same functional category. For example, in a queue of vehicles, the graphical element representing the vehicle closest to the user may be rendered fully, while graphical elements representing vehicles further away may be partially or entirely hidden behind the front vehicle. In such scenarios, the cost for hiding the less prominent vehicles is reduced, as the semantic function of the graphical elements is preserved by displaying the most relevant instance within the group. A technical benefit provided is that the method supports content prioritisation by enabling reduced visual redundancy for semantically related graphical elements, thereby preserving clarity while optimising the use of limited display space.

Optionally, the method further comprising identifying functional categories to which the respective ones of the at least two of the plurality of graphical elements belong,
  wherein when the distinct sets of the allowed operations for the respective ones of the at least two of the plurality of graphical elements comprise merging the graphical elements with other graphical elements, the step of determining the corresponding costs for the allowed operations in each of the distinct sets comprises:
  assigning respective costs for merging the at least two of the plurality of graphical elements based at least in part on whether the at least two of the plurality of graphical elements belong to a same functional category.

When the distinct sets of the allowed operations include merging the graphical elements with other graphical elements, the method determines the cost for merging based at least in part on whether the graphical elements to be merged belong to a same functional category. A lower cost is assigned when the graphical elements to be merged are part of a same functional category, as the merged graphical element continues to represent the same overall context. For example, when multiple pedestrians are being tracked and rendered individually, and their associated graphical elements begin to overlap, the method may merge the graphical elements into a single group-level graphical element that moves with the pedestrians as a unit. A higher cost may be associated with merging graphical elements that belong to different functional categories, as semantic clarity could be reduced. A technical benefit provided is that merging operations preserve interpretability of grouped content while temporarily reducing visual complexity, with the ability to later separate the graphical elements when the potential overlap is resolved.

Optionally, the method further comprising identifying functional categories to which the respective ones of the at least two of the plurality of graphical elements belong,
  wherein when the distinct sets of the allowed operations for the respective ones of the at least two of the plurality of graphical elements comprise displacing the graphical elements, the step of determining the corresponding costs for the allowed operations in each of the distinct sets comprises:
  assigning a cost for displacing a respective one of the at least two of the plurality of graphical elements based at least in part on a functional category to which the respective one of the at least two of the plurality of graphical elements belongs.

The displacement of the graphical element and the associated cost reflect how critical a position of the graphical element is to interpretability of the graphical element within the field of view of the user. For example, graphical elements that indicate a physical presence or a tracked location of a real-world object, such as a bounding box enclosing a person or piece of equipment within a factory, may be assigned a higher cost for displacement, as repositioning such a graphical element may cause a misalignment between the graphical element and the associated real-world reference. By contrast, another graphical element in a same functional category, such as a textual label describing the real-world object in the factory associated with the real-world objects, for example, "STAFF" or "EQUIPMENT", may be assigned a lower cost for displacement and may be permitted to move within a restricted direction, such as vertically, without disrupting interpretability. A technical benefit provided is that the method supports displacement decisions that preserve spatial alignment of high-priority graphical elements while allowing supplementary graphical elements to be repositioned, thereby maintaining both visual clarity and semantic consistency in the augmented-reality display.

Optionally, the step of determining the corresponding costs for the allowed operations in each of the distinct sets comprises:
  determining whether a given allowed operation has been repeatedly applied to a same graphical element; and
  increasing the cost of applying the given allowed operation based at least in part on a time duration during which the given allowed operation has been repeatedly applied to the same graphical element.

When the same operation is repeatedly applied to the graphical element over time, such as continuous displacement or frequent appearance modifications, the method increases the cost of applying the same operation again. The increase in cost is determined based at least in part on a time duration during which the operation has been repeatedly applied. The increase in cost prevents excessive or continuous layout changes that may cause visual instability or distraction. For example, if a graphical element is frequently displaced across successive images, further displacement becomes increasingly undesirable and is penalised accordingly. A technical benefit provided is that the method suppresses disruptive layout behaviour by discouraging repetitive modifications, thereby maintaining perceptual stability and improving an ability of the user to interpret the graphical elements over time.

Optionally, the method further comprising determining respective velocities at which the plurality of graphical elements are moving across a sequence of images, and respective directions in which the plurality of graphical elements are moving across the sequence of images, wherein the potential overlap is detected based further on respective locations of the plurality of graphical elements in the at least one image, and on the respective velocities and the respective directions of the plurality of graphical elements, and wherein the selected at least one operation is applied to the at least one of the at least two of the plurality of graphical elements, before any actual overlap occurs between the at least two of the plurality of graphical elements.

The determining of respective velocities and respective directions of movement for the graphical elements across the sequence of images enables to analyse how the graphical elements are expected to move within the field of view of the at least one user. The detection of the potential overlap is based not only on the current locations of the graphical elements in the at least one image, but also on the respective velocities and directions of the graphical elements. The detection of the potential overlap based also on the respective velocities and directions of the graphical elements allows to predict whether the graphical elements are likely to overlap in the near future.

The selected operation is applied to the at least one of the at least two graphical elements before any actual overlap occurs. The pre-emptive application of the selected operation allows the graphical element yielding priority to gradually fade out, shift position, or undergo another selected modification without sudden changes in layout. A technical benefit provided is that the method avoids abrupt visual transitions by detecting and resolving overlaps in advance, thereby improving perceptual continuity and reducing distraction in the augmented-reality display.

Optionally, the method further comprising:
dividing the image plane into a plurality of regions;
detecting when a number of graphical elements in a given region exceeds a predefined threshold number, and/or when a size of a part of the given region occupied by the graphical elements exceeds a predefined threshold size; and
when it is detected that the number exceeds the predefined threshold number, and/or the size exceeds the predefined threshold size, the step of selecting the at least one operation comprises selecting to apply at least one of:
(a) displacing at least one of the graphical elements to another region,
(b) resizing at least one of the graphical elements,
(c) hiding at least one of the graphical elements at least partially,
(d) merging at least two of the graphical elements.

Each region is evaluated to determine whether the corresponding region contains an excessive number of graphical elements or whether the graphical elements collectively occupy too much of available area of the region. A detection is performed to identify whether the number of graphical elements in the given region exceeds the predefined threshold number, and/or whether the size of the part of the given region occupied by the graphical elements exceeds the predefined threshold size. When either the number or the occupied size exceeds the corresponding threshold, the at least one operation is selected to be applied to reduce visual congestion within the region. The selected operation includes at least one of displacing graphical elements to another region, resizing graphical elements, partially hiding graphical elements, or merging two or more graphical elements. A technical benefit provided is that the method actively manages content density in different parts of the image plane to preserve readability, prevent visual clutter, and maintain clarity across the field of view of the at least one user, especially in scenarios involving large quantities of graphical elements.

Optionally, the method further comprising:
determining a gaze direction of each eye of the at least one user;
identifying at least one graphical element from the plurality of graphical elements at which the at least one user is gazing, based on the gaze direction of each eye;
detecting whether the identified at least one graphical element is among the at least two of the plurality of graphical elements; and
when it is detected that the identified at least one graphical element is among the at least two of the plurality of graphical elements, the step of selecting the at least one operation comprises selecting to apply the at least one operation to a remainder of the at least two of the plurality of graphical elements.

The identification of which graphical element or elements the user is currently looking at is based on correlating the gaze direction of each eye with positions of the graphical elements in the image plane. The identification allows to determine whether a graphical element falls within a focal attention of the user. When it is detected that the identified graphical element under a gaze of the user is one of the graphical elements involved in the potential overlap, the method comprises selecting to apply the at least one operation to a remainder of the overlapping graphical elements. For example, if the user is looking at one graphical element among a pair of graphical elements that are about to overlap, the method may preserve the position and appearance of that graphical element while displacing, hiding, or merging the other graphical element. A technical benefit provided is that the method preserves user-focused content by prioritising graphical elements currently under the gaze of the user, improving relevance and responsiveness of the augmented-reality display.

The present disclosure further relates to the system as described above. Various embodiments and variants disclosed above with respect to the method described in the first aspect, apply mutatis mutandis to the system in the second aspect.

Optionally, the at least one processor is further configured to classify the plurality of graphical elements into graphical elements of a first anchor type and graphical elements of a second anchor type, wherein a graphical element of the first anchor type is to be positioned in the at least one image based on a position of a corresponding real-world reference object, and wherein a graphical element of the second anchor type is to be positioned in the at least one image based on at least one spatial anchor positioned in a three-dimensional (3D) view frustum corresponding to the given eye, wherein the corresponding cost for each allowed operation in each of the distinct sets is determined based at least in part on whether the respective graphical element to which said allowed operation is to be applied has the first anchor type or the second anchor type.

The classification of the graphical elements into the first anchor type and the second anchor type allows the system to differentiate between graphical elements that are spatially fixed to real-world reference objects and those that are positioned relative to spatial anchors within the 3D view frustum corresponding to the given eye. The distinction between the first anchor type and the second anchor type enables the system to assign higher costs for operations such as displacement when applied to the graphical elements of the first anchor type, thereby maintaining alignment with real-world positions. A technical benefit provided is that the system preserves spatial coherence for real-world-anchored content while allowing more flexible repositioning of field-of-view-anchored graphical elements.

Optionally, when determining the corresponding costs for the allowed operations in each of the distinct sets, the at least one processor is configured to assign a cost for displacing a graphical element based at least in part on a displacement destination of the graphical element.

The displacement destination of the graphical element is considered when assigning the cost for displacement, allowing the system to prioritise the displacement destinations that minimise visual disruption. The cost may be influenced by factors such as distance from an intended position, position relative to a centre of a cross-section of the 3D view frustum, or whether the displacement occurs along a permitted axis. A technical benefit provided is that the system selects displacement destinations that preserve perceptual stability and visibility of the graphical element, while avoiding locations where visibility may be degraded due to position or motion constraints.

Optionally, the system comprising at least one real-world facing camera employed to capture at least one real-world image of a real-world environment;

wherein the at least one processor is configured to:

determine a colour and luminance of different portions of a real-world light field overlapping with respective portions of the image plane, based on the at least one real-world image and the relative location of the given eye with respect to the image plane; and calculate a colour difference and a luminance difference between a colour and luminance of a given graphical element and a colour and luminance of a portion of the real-world light field overlapping with a portion of the image plane that includes a given displacement destination for the given graphical element;

wherein when determining the corresponding costs for the allowed operations in each of the distinct sets, the at least one processor is configured to assign a cost for displacing the given graphical element to the given displacement destination based at least in part on the colour difference and the luminance difference.

The system uses the at least one real-world facing camera to analyse how the real-world light field appears through the image plane from the perspective of the given eye. The colour and luminance of the real-world content are compared with those of the graphical element at a given displacement destination. A higher cost is assigned when the graphical element is likely to blend into the background due to low contrast or similar colour and luminance. A lower cost is assigned when the graphical element remains visually distinct. A technical benefit provided is that the system avoids repositioning graphical elements into visually complex or low-contrast regions, thereby preserving legibility and visual prominence.

Optionally, the at least one processor is further configured to:

determine whether a given graphical element from the at least two of the plurality of graphical elements occupies more than a predefined percentage of a size of a 3D view frustum corresponding to the given eye along at least one direction; and when it is determined that the given graphical element occupies more than the predefined percentage of the size of the 3D view frustum along the at least one direction, and when a set of allowed operations for the given graphical element comprises hiding the given graphical element at least partially, the at least one processor is configured to, when selecting the at least one operation:

divide the given graphical element into graphical sub-elements based at least in part on a location of the potential overlap; and select to hide at least one of the graphical sub-elements that is nearest to the location of the potential overlap.

The system evaluates whether a graphical element occupies more than a predefined percentage of the 3D view frustum corresponding to the given eye along at least one direction. When it is determined that the graphical element occupies more than the predefined percentage and the allowed operations for the graphical element include partial hiding, the system divides the graphical element into graphical sub-elements based on the location of the potential overlap. The sub-element nearest to the location of the potential overlap is then selected for partial hiding. A technical benefit provided is that the system enables fine-grained visual adjustments by selectively hiding only the overlapping portion of a large graphical element, preserving its overall visibility and interpretability in the remaining region of the field of view.

Optionally, when the distinct sets of the allowed operations for the respective ones of the at least two of the plurality of graphical elements comprise hiding the respective ones of the at least two of the plurality of graphical elements at least partially, the at least one processor is configured to, when determining the corresponding costs for the allowed operations in each of the distinct sets, assign respective costs for at least partially hiding the respective ones of the at least two of the plurality of graphical elements based at least in part on relative sizes of the at least two of the plurality of graphical elements.

When partial hiding is among the allowed operations, the system evaluates the relative sizes of the graphical elements involved in the potential overlap to determine the corresponding costs. A lower cost is assigned for partially hiding a larger graphical element, especially when such hiding does not impair recognisability of the larger graphical element. A higher cost is assigned for partially hiding a smaller graphical element that may become visually ineffective if obscured. A technical benefit provided is that the system preserves functional clarity by favouring hiding decisions that minimise disruption to the graphical elements with smaller visual footprints.

Optionally, the at least one processor is further configured to identify functional categories to which the respective ones of the at least two of the plurality of graphical elements belong, wherein when the distinct sets of the allowed operations for the respective ones of the at least two of the plurality of graphical elements comprise hiding the respective ones of the at least two of the plurality of graphical elements at least partially, the at least one processor is configured to, when determining the corresponding costs for the allowed operations in each of the distinct sets, assign respective costs for at least partially hiding the respective ones of the at least two of the plurality of graphical elements based at least in part on whether the at least two of the plurality of graphical elements belong to a same functional category.

The system identifies functional categories for the graphical elements involved in the potential overlap and uses the identified functional categories when assigning costs for partial hiding. When the graphical elements belong to a same functional category, such as a group of similar real-world indicators, a lower cost is assigned for partially hiding one graphical element behind another graphical element belonging to the same functional category. The assignment of lower cost for hiding graphical elements belonging to the same functional category allows less prominent elements within the same group to be visually deprioritised without loss of semantic clarity. A technical benefit provided is that the system maintains interpretability by simplifying overlapping content within a shared functional context, reducing redundancy while preserving the most relevant information.

Optionally, the at least one processor is configured to identify functional categories to which the respective ones of the at least two of the plurality of graphical elements belong, wherein when the distinct sets of the allowed operations for the respective ones of the at least two of the plurality of graphical elements comprise merging the graphical elements with other graphical elements, the at least one processor is configured to, when determining the corresponding costs for the allowed operations in each of the distinct sets, assign respective costs for merging the at least two of the plurality of graphical elements based at least in part on whether the at least two of the plurality of graphical elements belong to a same functional category.

When the allowed operations include merging, the system considers whether the involved graphical elements belong to a same functional category. A lower cost is assigned when the graphical elements to be merged belong to the same functional category, as grouping the graphical elements belonging to the same functional category maintains semantic consistency. For example, indicators representing similar types of real-world objects may be combined into a single graphical element without compromising interpretability of the graphical elements. A technical benefit provided is that the system simplifies overlapping content by merging semantically related graphical elements, thereby reducing visual complexity while preserving contextual meaning.

Optionally, the at least one processor is configured to identify functional categories to which the respective ones of the at least two of the plurality of graphical elements belong,
wherein when the distinct sets of the allowed operations for the respective ones of the at least two of the plurality of graphical elements comprise displacing the graphical elements, the at least one processor is configured to, when determining the corresponding costs for the allowed operations in each of the distinct sets, assign a cost for displacing a respective one of the at least two of the plurality of graphical elements based at least in part on a functional category to which the respective one of the at least two of the plurality of graphical elements belongs.

The system uses the functional category of each graphical element to inform how the costs are assigned for displacement. The graphical elements with a functional role requiring spatial precision, such as those indicating tracked real-world objects, are assigned higher costs for displacement. Further, supplementary graphical elements within the same category, such as labels or annotations, may be displaced more freely and with lower cost. A technical benefit provided is that the system preserves spatial alignment for critical content while allowing limited repositioning of secondary elements, maintaining both semantic accuracy and layout flexibility.

Optionally, when determining the corresponding costs for the allowed operations in each of the distinct sets, the at least one processor is configured to:
determine whether a given allowed operation has been repeatedly applied to a same graphical element; and
increase the cost of applying the given allowed operation based at least in part on a time duration during which the given allowed operation has been repeatedly applied to the same graphical element.

The system monitors whether a given allowed operation has been repeatedly applied to a same graphical element over time. When repetition is detected, the system increases the cost of applying the same operation again, with the increase based at least in part on the time duration of continued application. The increase in cost associated repetition of the same operation discourages excessive or continuous modifications, such as frequent repositioning, that may result in unstable visual presentation. A technical benefit provided is that the system promotes visual consistency by limiting repetitive adjustments, thereby reducing distraction and improving user focus on the graphical elements.

Optionally, the at least one processor is configured to determine respective velocities at which the plurality of graphical elements are moving across a sequence of images, and respective directions in which the plurality of graphical elements are moving across the sequence of images,
wherein the potential overlap is detected based further on respective locations of the plurality of graphical elements in the at least one image, and on the respective velocities and the respective directions of the plurality of graphical elements, and
wherein the selected at least one operation is applied to the at least one of the at least two of the plurality of graphical elements, before any actual overlap occurs between the at least two of the plurality of graphical elements.

The system determines the respective velocities and directions of movement of the graphical elements across a sequence of images to predict the future positions of the graphical elements. The detection of the potential overlap incorporates both current locations and projected movement patterns. When the potential overlap is anticipated, the selected operation is applied before the graphical elements intersect in the image plane. A technical benefit provided is that the system performs anticipatory adjustments that prevent abrupt visual changes, allowing smoother transitions and reducing distraction for the user.

Optionally, the at least one processor is configured to:
divide the image plane into a plurality of regions;
detect when a number of graphical elements in a given region exceeds a predefined threshold number, and/or when a size of a part of the given region occupied by the graphical elements exceeds a predefined threshold size; and
when it is detected that the number exceeds the predefined threshold number, and/or the size exceeds the predefined threshold size, the at least one processor is configured to, when selecting the at least one operation, select to apply at least one of:
(a) displacing at least one of the graphical elements to another region,
(b) resizing at least one of the graphical elements,
(c) hiding at least one of the graphical elements at least partially,
(d) merging at least two of the graphical elements.

The system manages graphical element density by dividing the image plane into multiple regions and monitoring the number and size of graphical elements within each region. When a predefined threshold related to quantity or occupied area is exceeded in a given region, the system selects one or more operations to reduce visual congestion. The selected operation may include displacing, resizing, partially hiding, or merging graphical elements. A technical benefit provided is that the system preserves readability and clarity in regions with high content density, maintaining a balanced and interpretable visual layout across the image plane.

Optionally, the at least one processor is configured to:
determine a gaze direction of each eye of the at least one user;
identify at least one graphical element from the plurality of graphical elements at which the at least one user is gazing, based on the gaze direction of each eye;
detect whether the identified at least one graphical element is among the at least two of the plurality of graphical elements; and when it is detected that the identified at least one graphical element is among the at least two of the plurality of graphical elements, the at least one processor is configured to, when selecting the at least one operation, select to apply the at least one operation to a remainder of the at least two of the plurality of graphical elements.

The system uses the gaze direction of each eye of the at least one user to identify which graphical element is being directly observed. When the identified graphical element is involved in a potential overlap, the system selects to apply the operation to the remainder of the overlapping graphical elements, thereby preserving the position and visibility of the graphical element under a gaze of the user. A technical benefit provided is that the system prioritises user-focused content, ensuring that the most visually attended graphical elements remain undisturbed and perceptually stable within the field of view.

The term "augmented-reality (AR) display" as used throughout the present disclosure refers to a display device configured to present virtual content aligned with a view of a real-world environment, such that at least one image comprising graphical elements is visually perceived by the at least one user as being integrated within the real-world environment. The AR display may comprise an emissive panel, a projection surface, or a transmissive or semi-reflective medium through which the virtual content is rendered.

The term "processor" as used throughout the present disclosure refers to one or more hardware processing units, logic units, or computing resources configured to perform operations based on instructions. The processor is configured to perform one or more functions as recited in the claims, including generation or retrieval of at least one image, identification of graphical elements, detection of potential overlap, determination of allowed operations and corresponding costs, selection of operations based on cost, and application of selected operations to modify the image.

The term "real-world facing camera" as used throughout the present disclosure refers to a camera oriented toward a real-world environment and configured to capture at least one real-world image during presentation of the at least one image via the augmented-reality display. The real-world facing camera provides image data that enables analysis of colour and luminance of the real-world light field overlapping with the image plane from a perspective of the given eye.

DETAILED DESCRIPTION OF THE DRAWINGS

Figure 1:
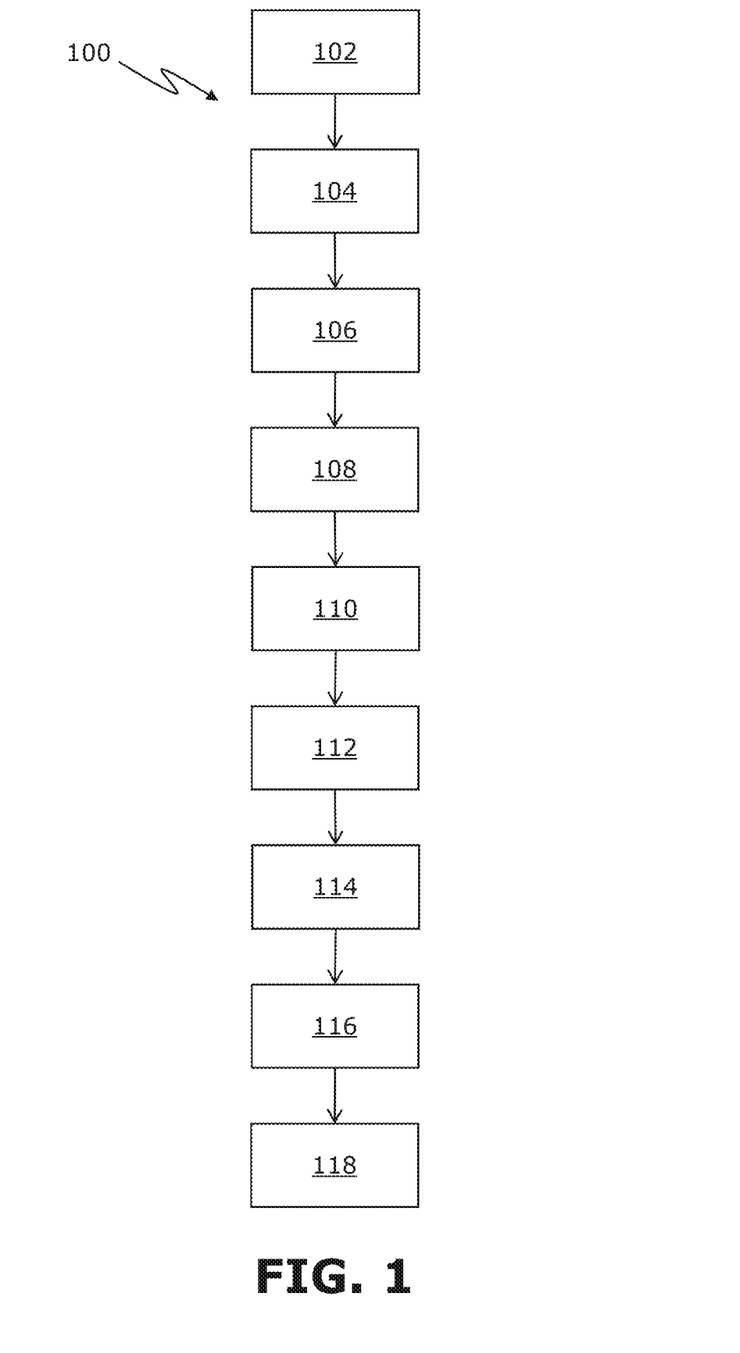
FIG. 1 shows steps of a method, in accordance with an embodiment of the present disclosure.

FIG. 1 shows steps of a method 100, in accordance with an embodiment of the present disclosure.

At step 102, information indicative of a relative location of each eye of at least one user with respect to an image plane of an augmented-reality (AR) display is obtained.

At step 104, at least one image to be displayed via the AR display is generated or retrieved, based on the relative location of each eye of the at least one user with respect to the image plane.

At step 106, a plurality of graphical elements to be presented by the at least one image is identified.

At step 108, a potential overlap between at least two of the plurality of graphical elements is detected from a perspective of a given eye of the at least one user, based on a relative location of the given eye with respect to the image plane.

At step 110, distinct sets of allowed operations are identified for respective ones of the at least two of the plurality of graphical elements, wherein a set of allowed operations for a graphical element comprises at least one of: displacing the graphical element, resizing the graphical element, hiding the graphical element at least partially, merging the graphical element with another graphical element, or modifying at least one appearance parameter of the graphical element.

At step 112, for each allowed operation in each of the distinct sets, a corresponding cost representing a penalty for applying the allowed operation on a respective graphical element is determined.

At step 114, based on the allowed operations in each of the distinct sets and their corresponding costs, at least one operation to be applied to at least one of the at least two of the plurality of graphical elements to prevent the potential overlap is selected.

At step 116, the selected at least one operation is applied to the at least one of the at least two of the plurality of graphical elements, to modify the at least one image to be displayed.

At step 118, the at least one image is displayed at the AR display.

The aforementioned steps are only illustrative and other alternatives can also be provided where one or more steps are added, one or more steps are removed, or one or more steps are provided in a different sequence without departing from the scope of the claims herein.

Figure 2:
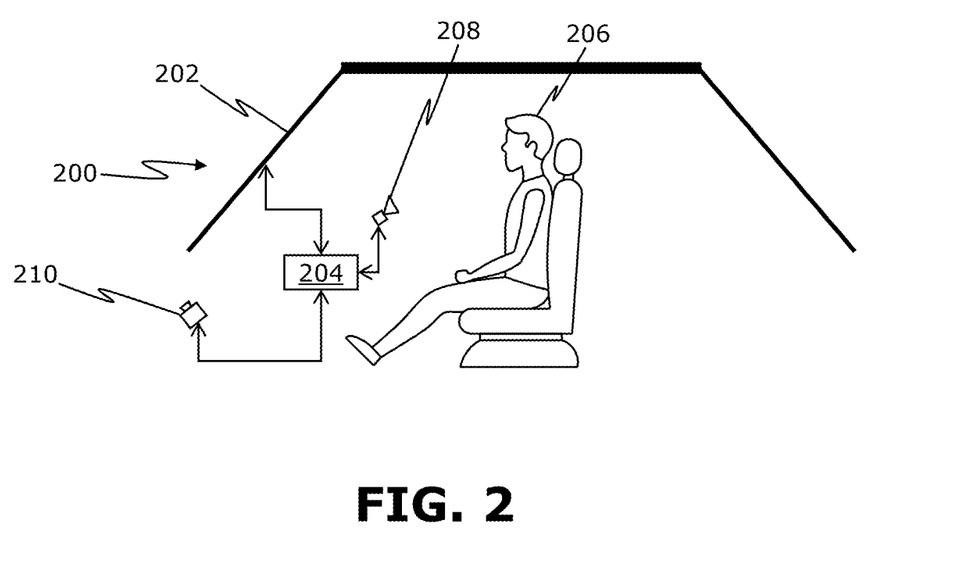
FIG. 2 shows an exemplary implementation of a system, in accordance with an embodiment of the present disclosure.

FIG. 2 shows an exemplary implementation of a system 200, in accordance with an embodiment of the present disclosure. The system 200 is implemented within a vehicle and comprises an augmented-reality (AR) display 202 integrated within a windshield of the vehicle. The system 200 further comprises at least one processor 204. As shown, the at least one processor 204 is operatively connected to the AR display 202. A single processor 204 is shown in FIG. 2 for simplicity. However, it will be appreciated that multiple processors can be implemented within the system 200, without departing from the scope of the claims herein.

The at least one processor 204 is configured to obtain information indicative of a relative location of each eye of at least one user 206 such as a driver of the vehicle, with respect to an image plane of the AR display 202. Based on the relative location of each eye of the at least one user 206, the at least one processor 204 is configured to generate or retrieve at least one image (not shown in FIG. 1 but shown later in FIG. 2) to be displayed via the AR display 202. The at least one processor 204 identifies a plurality of graphical elements (not shown in FIG. 2 but shown later in FIG. 3) to be presented by the at least one image and detects a potential overlap between at least two of the graphical elements from a perspective of a given eye of the at least one user 206, based on a relative location of the given eye with respect to the image plane of the AR display 202.

The at least one processor 204 identifies distinct sets of allowed operations for respective ones of the at least two graphical elements, wherein each set of allowed operations comprises at least one of: displacing the graphical element, resizing the graphical element, hiding the graphical element at least partially, merging the graphical element with another graphical element, or modifying at least one appearance parameter of the graphical element. For each allowed operation, the at least one processor 204 determines a corresponding cost representing a penalty for applying the allowed operation on the respective graphical element.

The at least one processor 204 selects, based on the allowed operations and their corresponding costs, at least one operation to be applied to at least one of the overlapping graphical elements to prevent the potential overlap. The selected operation is then applied to the at least one graphical element to modify the image, and the modified image is displayed via the AR display 202.

The system 200 further comprises a tracker 208 and at least one real-world facing camera 210. Only a single real-world facing camera 210 is shown in FIG. 2 for simplicity. However, it will be appreciated that multiple real-world facing cameras can be implemented within the system 200, without departing from the scope of the claims herein. The tracker 208 is configured to detect the relative location of each eye of the at least one user 206 with respect to the image plane of the AR display 202. The at least one real-world facing camera 210 is employed to capture at least one real-world image of a real-world environment. The at least one processor 204 is configured to determine a colour and luminance of different portions of a real-world light field overlapping with respective portions of the image plane based on the at least one real-world image and the relative location of the given eye, and to assign a cost for displacing a graphical element to a given displacement destination based at least in part on a colour difference and a luminance difference.

It will be understood that FIG. 2 presents a simplified representation of the system 200 to aid clarity of explanation. Additional system components, such as additional tracking means, rendering subsystems, or data repositories, may also be incorporated as part of the system 200 depending on a specific implementation thereof.

Figure 3:
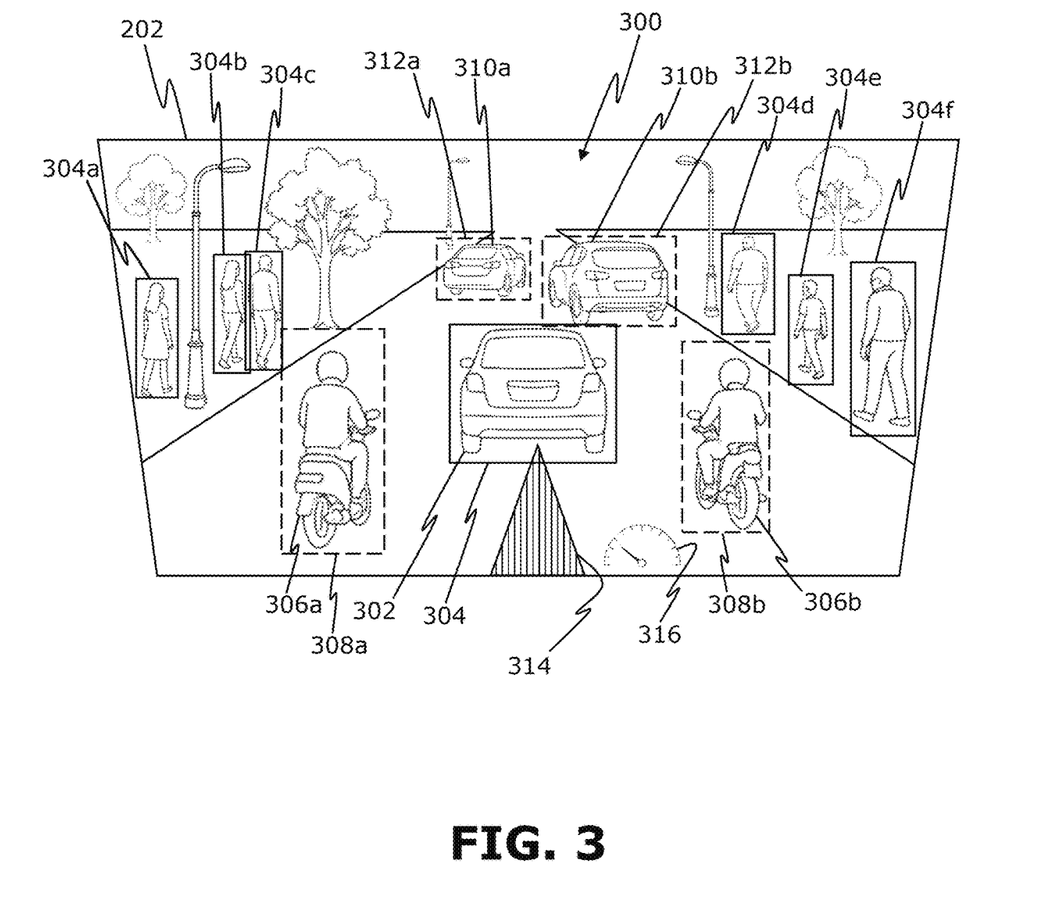
FIG. 3 shows a representative viewing scenario on the AR display shown in FIG. 2, in accordance with an embodiment of the present disclosure.

FIG. 3 shows a representative viewing scenario 300 on the AR display 202 shown in FIG. 2, in accordance with an embodiment of the present disclosure. As shown, a first vehicle 302 ahead of the vehicle in which a system (such as the system 200 shown in FIG. 2) is implemented (referred to as "present vehicle" herein after) and located along a same trajectory as the present vehicle, is marked with graphical elements (304a-f) of a solid box. The graphical elements (304a-f) of the solid box indicates that no operations or only minimal operations are permitted for the respective graphical elements (304a-f). Other vehicles not on a driving path of the present vehicle, such as motorbikes (306a-b), are marked with corresponding graphical elements (308a-b) and cars (310a-b) are marked with corresponding graphical elements (312a-b) of dashed boxes, representing that the graphical elements (308a-b, 312a-b) are associated with greater flexibility in allowed operations. Similarly, pedestrians walking along a side of a road along which the present vehicle is being driven, are enclosed in graphical elements (304a-f) of solid boxes similar to the graphical elements (304a-f) enclosing the first vehicle 302, indicating that the graphical elements are either not permitted to undergo modification or are associated with high penalties for operations such as displacement or partial hiding.

Also shown is a graphical element 314 representing a navigation arrow and positioned toward a central portion of the AR display 202. The graphical element 314 is rendered as a segmented structure, wherein individual segments may be selectively hidden based on respective cost values assigned to each segment. Moreover, a graphical element 316 representing a speedometer is shown near a bottom right region of the AR display 202, indicating a driving speed of the present vehicle. The graphical element 314 representing the navigation arrow and the graphical element 316 representing the speedometer are associated with allowed operations that include displacement or partial hiding at relatively lower costs, enabling layout modifications that preserve visibility of high-priority graphical elements, such as the graphical elements (304a-f) of solid boxes, while avoiding overlaps.

Figure 4:
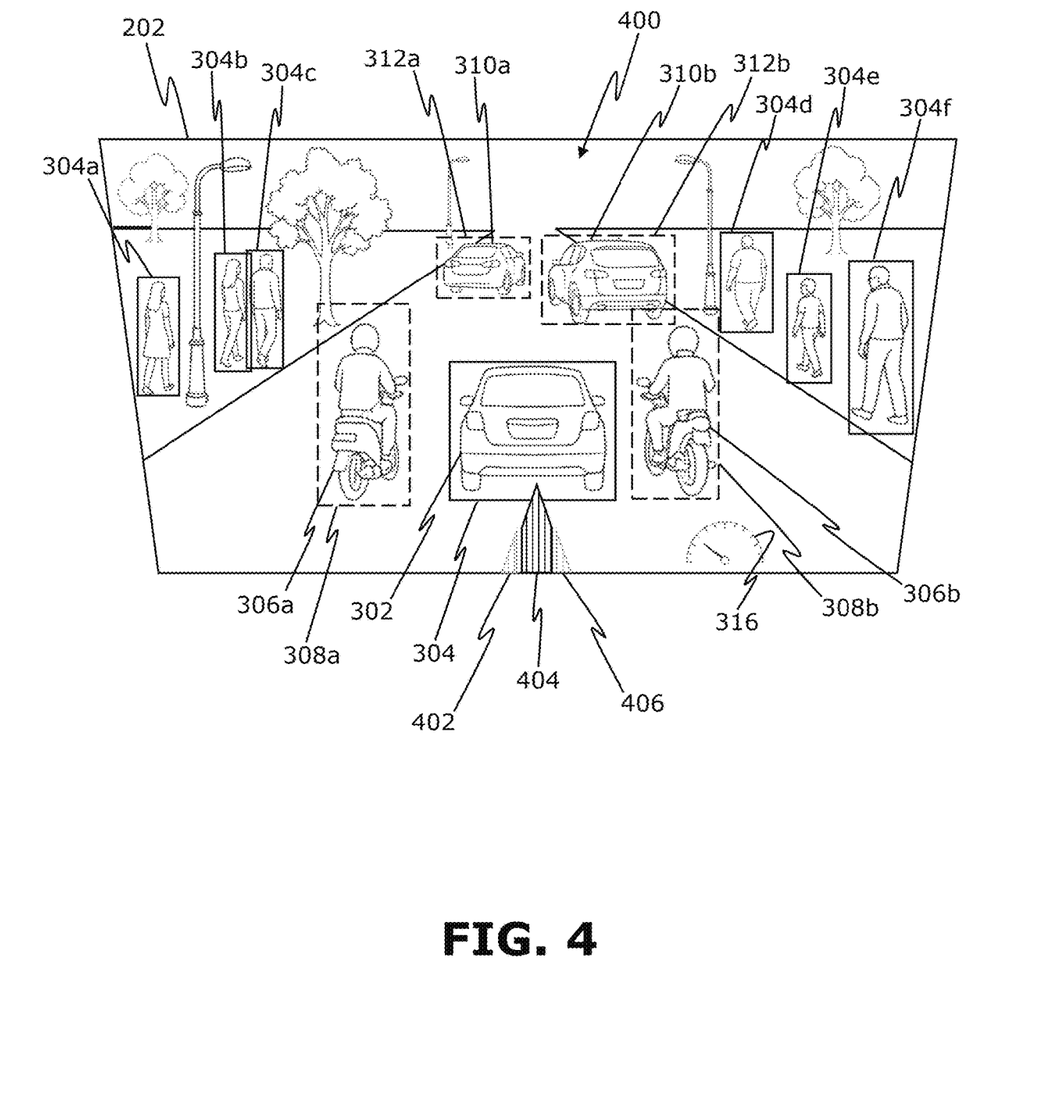
FIG. 4 shows a continuation of the representative viewing scenario shown in FIG. 3, in accordance with an embodiment of the present disclosure.

FIG. 4 shows a continuation 400 of the representative viewing scenario 300 shown in FIG. 3, in accordance with an embodiment of the present disclosure. As shown, the present vehicle has moved forward and is now closer to the first vehicle 302. The graphical elements (304a-f) of the solid box continues to represent the first vehicle 302, and no operations or only minimal operations are permitted for the graphical elements (304a-f).

To prevent overlap of the graphical elements (304a-f) with the graphical element 314 representing the navigation arrow, the graphical element 314 is rendered as a segmented structure comprising multiple segments 402, 404, and 406, such that a central segment 404 continues to be displayed and adjacent segments 402 and 406 have been partially hidden through partial fading-out of the adjacent segments 402 and 406. The partial hiding of the segments 402 and 406 allows the graphical elements (304a-f) of the solid box to remain visible without interruption, while preserving the functional intent of navigation guidance provided by the graphical element 314. The selective hiding of the adjacent segments 402 and 406 is performed based on cost values associated with each segment 402, 404 and 406 of the graphical element 314 (shown as a single graphical element 314 representing the navigation arrow in FIG. 3).

Additionally, as shown, the graphical element 316 representing the speedometer has been repositioned further to the right, compared to the position of the graphical element 316 shown in FIG. 3. The displacement of the graphical element 316 is performed pre-emptively by the at least one processor 204 of the system 200 in response to identifying that the graphical element 316, if retained in an original position thereof, may overlap with the graphical elements (304a-f) of the first vehicle 302 as the present vehicle moves forward. The displacement of the graphical element 316 occurs with a relatively low associated cost, allowing the graphical elements (304a-f) to remain unmodified while maintaining perceptual clarity of both graphical elements.

Thus, the system 200 applies different layout operations such as partial hiding or displacement selectively and in advance of actual overlap, based on prediction of spatial relationships between the graphical elements 304a-f, 308a-b, 312a-b, 314 and 316. The operation of the system 200 enables preservation of visibility for high-priority content on the AR display 202 to the at least one user 206 while dynamically adapting the layout of flexible graphical elements 308a-b, 312a-b, 314 and 316 to prevent visual interference with prioritised graphical elements 304.

Figure 5:
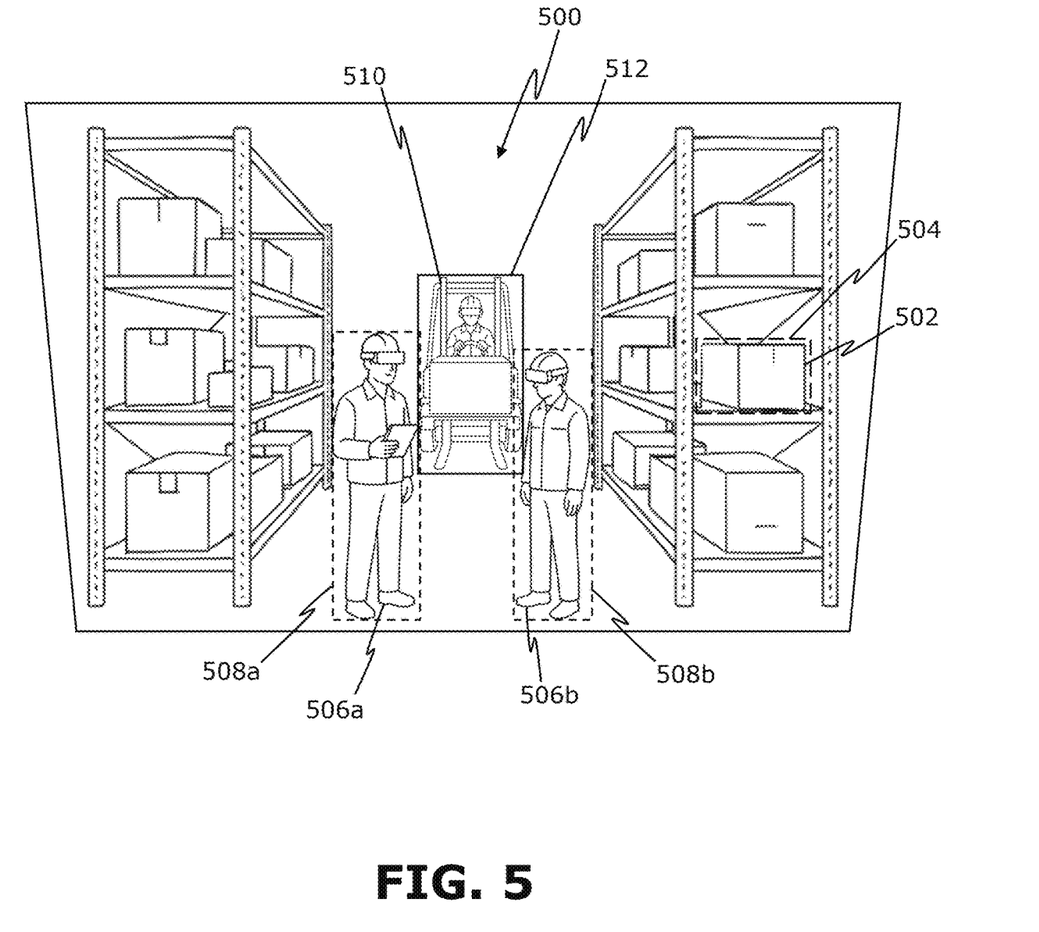
FIG. 5 shows a representative viewing scenario as perceived through a head-mounted augmented-reality (AR) display associated with a system (such as the system shown in FIG. 2), in accordance with an embodiment of the present disclosure.

FIG. 5 shows a representative viewing scenario 500 as perceived through a head-mounted augmented-reality (AR) display (not shown) associated with a system (such as the system 200 shown in FIG. 2), in accordance with an embodiment of the present disclosure. The head-mounted AR display is worn by a user operating within an indoor environment of a warehouse. As shown, a package 502 to be handled by the user wearing the head-mounted AR display is identified by a graphical element 504 rendered as a long-dashed box. The graphical element 504 rendered as the long-dashed box indicates that layout modifications such as displacement or partial hiding are permitted with respect to the graphical element 504.

Other workers in the environment, such as a first worker 506a and a second worker 506b, are respectively enclosed in graphical elements 508a and 508b rendered as short-dashed boxes. The graphical elements 508a and 508b rendered as the short-dashed boxes are also associated with allowed operations and are assigned corresponding costs based on the nature of overlap with other graphical elements and based on a functional category to which each graphical element belongs.

Further shown is a forklift 510 moving within the same space toward the user wearing the head-mounted AR display. The forklift 510 is marked by a graphical element 512 rendered as a solid box. The graphical element 512 rendered as the solid box indicates that either no modification or only limited modification is permitted, as the graphical element 512 corresponds to a real-world object of the forklift 510 that may present a safety risk to the user wearing the head-mounted AR display. Based on a relative location of the eye of the user wearing the head-mounted AR display with respect to the image plane of the AR display, a potential overlap may be detected between the graphical element 512 and one or more of the graphical elements 504, 508a, or 508b. In such a case, the system selects to modify only those graphical elements for which allowed operations with lower associated costs have been identified, while retaining visibility of the graphical element 512 without modification.

The representative viewing scenario 500 demonstrates that the system enables dynamic adaptation of graphical elements based on their spatial relationship and functional priority, thereby maintaining visibility of critical content while applying cost-governed adjustments to less critical elements.

The invention claimed is:

1. A method comprising:
   obtaining information indicative of a relative location of each eye of at least one user with respect to an image plane of an augmented-reality (AR) display;
   generating or retrieving at least one image to be displayed via the AR display, based on the relative location of each eye of the at least one user with respect to the image plane;
   identifying a plurality of graphical elements to be presented by the at least one image;
   detecting a potential overlap between at least two of the plurality of graphical elements from a perspective of a given eye of the at least one user, based on a relative location of the given eye with respect to the image plane;
   identifying distinct sets of allowed operations for respective ones of the at least two of the plurality of graphical elements, wherein a set of allowed operations for a graphical element comprises at least one of:
      displacing the graphical element,
      resizing the graphical element,
      hiding the graphical element at least partially,
      merging the graphical element with another graphical element,
      modifying at least one appearance parameter of the graphical element;
   for each allowed operation in each of the distinct sets, determining a corresponding cost representing a penalty for applying said allowed operation on a respective graphical element;
   selecting, based on the allowed operations in each of the distinct sets and their corresponding costs, at least one operation to be applied to at least one of the at least two of the plurality of graphical elements to prevent the potential overlap;
   applying the selected at least one operation to the at least one of the at least two of the plurality of graphical elements, to modify the at least one image to be displayed; and
   displaying the at least one image at the AR display.

2. The method of claim 1, further comprising classifying the plurality of graphical elements into graphical elements of a first anchor type and graphical elements of a second anchor type,
   wherein a graphical element of the first anchor type is to be positioned in the at least one image based on a position of a corresponding real-world reference object, and wherein a graphical element of the second anchor type is to be positioned in the at least one image based on at least one spatial anchor positioned in a three-dimensional (3D) view frustum corresponding to the given eye,
   wherein the corresponding cost for each allowed operation in each of the distinct sets is determined based at least in part on whether the respective graphical element to which said allowed operation is to be applied has the first anchor type or the second anchor type.

3. The method of claim 1, wherein the step of determining the corresponding costs for the allowed operations in each of the distinct sets comprises assigning a cost for displacing a graphical element based at least in part on a displacement destination of the graphical element.

4. The method of claim 1, further comprising:
   capturing at least one real-world image of a real-world environment using at least one real-world facing camera;
   determining a colour and luminance of different portions of a real-world light field overlapping with respective portions of the image plane, based on the at least one real-world image and the relative location of the given eye with respect to the image plane; and
   calculating a colour difference and a luminance difference between a colour and luminance of a given graphical element and a colour and luminance of a portion of the real-world light field overlapping with a portion of the image plane that includes a given displacement destination for the given graphical element;
   wherein the step of determining the corresponding costs for the allowed operations in each of the distinct sets comprises assigning a cost for displacing the given graphical element to the given displacement destination based at least in part on the colour difference and the luminance difference.

5. The method of claim 1, further comprising:
   determining whether a given graphical element from the at least two of the plurality of graphical elements occupies more than a predefined percentage of a size of a three-dimensional (3D) view frustum corresponding to the given eye along at least one direction; and
   when it is determined that the given graphical element occupies more than the predefined percentage of the size of the 3D view frustum along the at least one direction, and when a set of allowed operations for the given graphical element comprises hiding the given graphical element at least partially, the step of selecting the at least one operation comprises:
      dividing the given graphical element into graphical sub-elements based at least in part on a location of the potential overlap; and
      selecting to hide at least one of the graphical sub-elements that is nearest to the location of the potential overlap.

6. The method of claim 1, wherein when the distinct sets of the allowed operations for the respective ones of the at least two of the plurality of graphical elements comprise hiding the respective ones of the at least two of the plurality of graphical elements at least partially, the step of determining the corresponding costs for the allowed operations in each of the distinct sets comprises:
assigning respective costs for at least partially hiding the respective ones of the at least two of the plurality of graphical elements based at least in part on relative sizes of the at least two of the plurality of graphical elements.

7. The method of claim 1, further comprising identifying functional categories to which the respective ones of the at least two of the plurality of graphical elements belong, wherein when the distinct sets of the allowed operations for the respective ones of the at least two of the plurality of graphical elements comprise hiding the respective ones of the at least two of the plurality of graphical elements at least partially, the step of determining the corresponding costs for the allowed operations in each of the distinct sets comprises:
assigning respective costs for at least partially hiding the respective ones of the at least two of the plurality of graphical elements based at least in part on whether the at least two of the plurality of graphical elements belong to a same functional category.

8. The method of claim 1, further comprising identifying functional categories to which the respective ones of the at least two of the plurality of graphical elements belong, wherein when the distinct sets of the allowed operations for the respective ones of the at least two of the plurality of graphical elements comprise merging the graphical elements with other graphical elements, the step of determining the corresponding costs for the allowed operations in each of the distinct sets comprises:
assigning respective costs for merging the at least two of the plurality of graphical elements based at least in part on whether the at least two of the plurality of graphical elements belong to a same functional category.

9. The method of claim 1, further comprising identifying functional categories to which the respective ones of the at least two of the plurality of graphical elements belong, wherein when the distinct sets of the allowed operations for the respective ones of the at least two of the plurality of graphical elements comprise displacing the graphical elements, the step of determining the corresponding costs for the allowed operations in each of the distinct sets comprises:
assigning a cost for displacing a respective one of the at least two of the plurality of graphical elements based at least in part on a functional category to which the respective one of the at least two of the plurality of graphical elements belongs.

10. The method of claim 1, wherein the step of determining the corresponding costs for the allowed operations in each of the distinct sets comprises:
determining whether a given allowed operation has been repeatedly applied to a same graphical element; and
increasing the cost of applying the given allowed operation based at least in part on a time duration during which the given allowed operation has been repeatedly applied to the same graphical element.

11. The method of claim 1, further comprising determining respective velocities at which the plurality of graphical elements are moving across a sequence of images, and respective directions in which the plurality of graphical elements are moving across the sequence of images,
wherein the potential overlap is detected based further on respective locations of the plurality of graphical elements in the at least one image, and on the respective velocities and the respective directions of the plurality of graphical elements, and
wherein the selected at least one operation is applied to the at least one of the at least two of the plurality of graphical elements, before any actual overlap occurs between the at least two of the plurality of graphical elements.

12. The method of claim 1, further comprising:
dividing the image plane into a plurality of regions;
detecting when a number of graphical elements in a given region exceeds a predefined threshold number, and/or when a size of a part of the given region occupied by the graphical elements exceeds a predefined threshold size; and
when it is detected that the number exceeds the predefined threshold number, and/or the size exceeds the predefined threshold size, the step of selecting the at least one operation comprises selecting to apply at least one of:
(a) displacing at least one of the graphical elements to another region,
(b) resizing at least one of the graphical elements,
(c) hiding at least one of the graphical elements at least partially,
(d) merging at least two of the graphical elements.

13. The method of claim 1, further comprising:
determining a gaze direction of each eye of the at least one user;
identifying at least one graphical element from the plurality of graphical elements at which the at least one user is gazing, based on the gaze direction of each eye;
detecting whether the identified at least one graphical element is among the at least two of the plurality of graphical elements; and
when it is detected that the identified at least one graphical element is among the at least two of the plurality of graphical elements, the step of selecting the at least one operation comprises selecting to apply the at least one operation to a remainder of the at least two of the plurality of graphical elements.

14. A system comprising:
an augmented-reality (AR) display; and
at least one processor configured to:
obtain information indicative of a relative location of each eye of at least one user with respect to an image plane of the AR display;
generate or retrieve at least one image to be displayed via the AR display, based on the relative location of each eye of the at least one user with respect to the image plane;
identify a plurality of graphical elements to be presented by the at least one image;
detect a potential overlap between at least two of the plurality of graphical elements from a perspective of a given eye of the at least one user, based on a relative location of the given eye with respect to the image plane;
identify distinct sets of allowed operations for respective ones of the at least two of the plurality of graphical elements, wherein a set of allowed operations for a graphical element comprises at least one of:
displacing the graphical element,
resizing the graphical element,
hiding the graphical element at least partially, merging the graphical element with another graphical element, modifying at least one appearance parameter of the graphical element;

for each allowed operation in each of the distinct sets, determine a corresponding cost representing a penalty for applying said allowed operation on a respective graphical element;

select, based on the allowed operations in each of the distinct sets and their corresponding costs, at least one operation to be applied to at least one of the at least two of the plurality of graphical elements to prevent the potential overlap;

apply the selected at least one operation to the at least one of the at least two of the plurality of graphical elements, to modify the at least one image to be displayed; and display the at least one image at the AR display.

15. The system of claim 14, wherein when determining the corresponding costs for the allowed operations in each of the distinct sets, the at least one processor is configured to assign a cost for displacing a graphical element based at least in part on a displacement destination of the graphical element.

16. The system of claim 14, further comprising at least one real-world facing camera employed to capture at least one real-world image of a real-world environment;

wherein the at least one processor is configured to:
determine a colour and luminance of different portions of a real-world light field overlapping with respective portions of the image plane, based on the at least one real-world image and the relative location of the given eye with respect to the image plane; and
calculate a colour difference and a luminance difference between a colour and luminance of a given graphical element and a colour and luminance of a portion of the real-world light field overlapping with a portion of the image plane that includes a given displacement destination for the given graphical element;

wherein when determining the corresponding costs for the allowed operations in each of the distinct sets, the at least one processor is configured to assign a cost for displacing the given graphical element to the given displacement destination based at least in part on the colour difference and the luminance difference.

17. The system of claim 14, wherein when the distinct sets of the allowed operations for the respective ones of the at least two of the plurality of graphical elements comprise hiding the respective ones of the at least two of the plurality of graphical elements at least partially, the at least one processor is configured to, when determining the corresponding costs for the allowed operations in each of the distinct sets, assign respective costs for at least partially hiding the respective ones of the at least two of the plurality of graphical elements based at least in part on relative sizes of the at least two of the plurality of graphical elements.

18. The system of claim 14, wherein when determining the corresponding costs for the allowed operations in each of the distinct sets, the at least one processor is configured to:
determine whether a given allowed operation has been repeatedly applied to a same graphical element; and
increase the cost of applying the given allowed operation based at least in part on a time duration during which the given allowed operation has been repeatedly applied to the same graphical element.

19. The system of claim 14, wherein the at least one processor is configured to determine respective velocities at which the plurality of graphical elements are moving across a sequence of images, and respective directions in which the plurality of graphical elements are moving across the sequence of images,
wherein the potential overlap is detected based further on respective locations of the plurality of graphical elements in the at least one image, and on the respective velocities and the respective directions of the plurality of graphical elements, and
wherein the selected at least one operation is applied to the at least one of the at least two of the plurality of graphical elements, before any actual overlap occurs between the at least two of the plurality of graphical elements.

20. The system of claim 14, wherein the at least one processor is configured to:
determine a gaze direction of each eye of the at least one user;
identify at least one graphical element from the plurality of graphical elements at which the at least one user is gazing, based on the gaze direction of each eye;
detect whether the identified at least one graphical element is among the at least two of the plurality of graphical elements; and
when it is detected that the identified at least one graphical element is among the at least two of the plurality of graphical elements, the at least one processor is configured to, when selecting the at least one operation, select to apply the at least one operation to a remainder of the at least two of the plurality of graphical elements.

* * * * *